Nov. 6, 1945.   J. DE MOOY   2,388,603
PLATE FASTENING DEVICE
Filed March 5, 1942
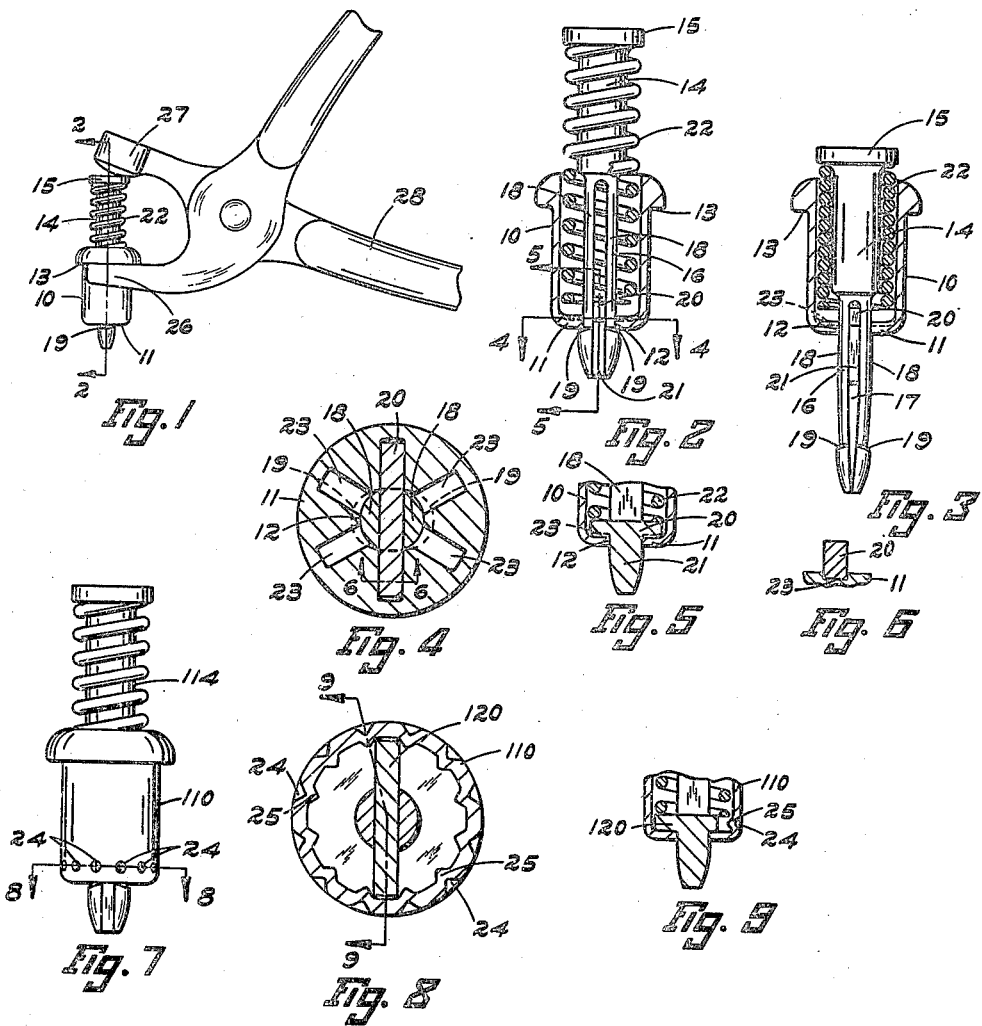
INVENTOR
JOHN DE MOOY
BY
ATTORNEY Patented Nov. 6, 1945

2,388,603

UNITED STATES PATENT OFFICE 2,388,603

PLATE FASTENING DEVICE

John De Mooy, Shaker Heights, Ohio, assignor to The Cleveland Pneumatic Tool Company, Cleveland, Ohio, a corporation of Ohio Application March 5, 1942, Serial No. 433,432

7 Claims. (Cl. 85—5)

This invention relates broadly to a plate fastening device, but more particularly to an improved temporary rivet for securing perforated plates in superposed relation preparatory to the riveting thereof.

My co-pending application, Serial No. 420,955, filed November 29, 1941, shows and describes a fastening device of this character and the present application is a continuation in part, of said co-pending application.

In certain prior art devices of this character, the clamping pin is free to rotate relatively to the housing, a feature which in some instances has been found to cause breakage of the spring acting on the pin. Free rotation of the pin tends to subject the spring to a torsional force which when combined with the repeated compression and release of the spring results in the premature breakage of the spring. It is therefore an object of this invention to produce a clamping device of the type described in my co-pending application wherein the clamping pin is held against rotation relative to the housing.

Another object of this invention is to produce an efficient and relatively inexpensive method of preventing rotation of the clamping pin relative to the housing.

Other objects and advantages more or less ancillary to the foregoing reside in the specific construction and aggroupment of the elements peculiar to this structure, as will become apparent from a more complete examination of this specification.

In the drawing:

Fig. 1 is a side elevational view of a temporary rivet embodying the invention shown with a portion of a special plier with which the device is applied to and removed from the work.

Fig. 2 is an enlarged longitudinal sectional view of the device taken in a plane indicated by line 2—2 in Fig. 1.

Fig. 3 is a view similar to Fig. 2, but showing the clamping pin in position for insertion through aligned perforations.

Fig. 4 is an enlarged cross sectional view taken in a plane indicated by line 4—4 in Fig. 2.

Fig. 5 is a longitudinal sectional view taken in a plane indicated by line 5—5 in Fig. 2.

Fig. 6 is a sectional view taken through a plane indicated by line 6—6 in Fig. 4.

Fig. 7 is a side elevational view of a plate fastening device embodying a modification of the invention.

Fig. 8 is an enlarged cross sectional view taken in a plane indicated by line 8—8 in Fig. 7.

Fig. 9 is a reduced longitudinal sectional view taken through a plane indicated by line 9—9 in Fig. 8.

Referring to the drawing, 10 represents a cup-shaped housing having a bottom 11 through which extends a central bore 12. The housing 10 is provided at its upper end with a circular bead forming an annular shoulder 13, the purpose of which will be explained later.

Slidably mounted in the housing 10 there is a clamping pin 14 formed at its upper end with a head 15 and having a reduced portion 16 slidable through the bore 12. The portion 16 is slotted as at 17 to form two normally laterally spaced legs 18 each having its free end formed with a lateral projection 19.

Resting on the bottom 11 of the housing 10, there is a T-shaped spreader 20 of a thickness equal to the width of the slot 17 and formed with a depending tail portion 21 extending through the bore 12 of the housing 10. The spreader 20 is located in the slot 17 between the legs 18 for normally maintaining these legs apart.

Seated on the spreader 20 there is one end of a compression spring 22 which has its other end engaging the underside of the clamping pin head 15 and through which the pin 14 is urged upwardly relative to the housing 10.

In order to prevent relative rotation of the pin 14 with the housing 10, the spreader 20 located in the slot 17 of the pin 14 is locked against rotation relative to the housing 10. This locking of the spreader to the housing may be effected in several different ways, the preferred one being shown to include a plurality of diametrically opposed relatively shallow recesses 23 provided in the inner surface of the bottom 11 of the housing 10. The width of these recesses is equal to or preferably slightly greater than the thickness of the spreader 20. When the device is assembled, the cross head of the spreader is dropped within any two diametrically opposed recesses 23, thereby preventing rotation of the spreader and consequently of the pin 14 relative to the housing 10. The spreader 20 is maintained in the recesses 23 against accidental removal therefrom by the compression spring 22 having one end seated on the cross head of the spreader and the other end on the under side of the head 15 of the pin 14 for urging the pin upwardly relative to the housing 10.

In the modification shown in Figs. 7 to 9 inclusive, the external side wall of the housing 110 adjacent the bottom thereof is provided with a plurality of diametrically opposed detents 24 which are pressed in the external surface of the housing to form on the inner surface corresponding radially protruding nubs 25, the distance between any two adjacent nubs being equivalent to the thickness of the spreader 120 which is also disposed in the housing and rests on the bottom thereof and is located between the nubs 25 for preventing rotation of the spreader relative to the housing 110 and consequently rotation of the clamping pin 114 with respect to the housing 110.

When applying the device to and removing it from the work it is placed between the jaws 26 and 27 of a plier 28, the jaw 26 being slotted to engage the annular shoulder 13 while the jaw 27 is adapted to engage the head 15 of the pin 14. Upon movement of the jaws 26 and 27 toward each other, the spring 22 will be compressed and the pin 14 driven downwardly relative to the housing 10 for insertion of the lateral projections 19 through aligned perforations in superposed sheets. When the plier is removed from the device, the spring 22 will urge the pin 14 upwardly causing the sheets to be clamped between the bottom 12 of the housing 10 and the lateral projections 19 of the pin 14.

It is to be readily understood that the spreader 20, although mounted within the housing 10 against relative rotation, can be readily replaced when required by turning the housing 10 upside down, thus allowing the spreader to fall out of its recess and move to the inner end of the slot 17. This will permit the legs 18 to pass through the bore 12 in the bottom wall of the housing.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A temporary rivet including a substantially cupshaped housing having a bore through the bottom thereof, a clamping pin slidably mounted in said housing having legs slidable through said bore, a T-shaped spreader having a crossarm resting on the bottom of said housing between said legs for normally maintaining said legs apart, the lower end of said housing having a plurality of recesses into any one of which said crossarm is adapted to fit for preventing rotation of said clamping pin.

2. A temporary rivet including a substantially cupshaped housing having a bore through the bottom thereof, a headed pin slidably mounted in said housing having legs slidable through said bore, a T-shaped spreader having a crossarm resting on the bottom of said housing between said legs for normally maintaining said legs apart, the lower end of said housing having a plurality of recesses into any one of which said crossarm is adapted to fit for preventing rotation of the spreader relative to the housing, and a compression spring seated on the spreader and on the head of said pin whereby said spreader is maintained against axial movement relative to the housing.

3. A temporary rivet including a substantially cupshaped housing having a bore through the bottom thereof, a clamping pin slidably mounted in said housing having legs slidable through said bore, the bottom of said housing having a recess in its inner surface extending radially from said bore, a spreader in said recess non-rotatable relative to said housing and extending between said legs for normally maintaining said legs apart, and a compression spring in said housing active on said spreader for maintaining it in said recess.

4. A temporary rivet including a substantially cupshaped housing having a bore through the bottom thereof, a clamping pin slidably mounted in said housing having legs slidable through said bore, the bottom of said housing having a recess in its inner surface, a spreader fitted in said recess against rotation relative to said housing, said spreader extending between said legs for normally maintaining them apart, and a compression spring in said housing active on said spreader for maintaining it in said recess.

5. A temporary rivet including a substantially cup-shaped housing having a bore through the bottom thereof, a clamping pin slidably mounted in said housing having legs slidable through said bore, the bottom of said housing having a plurality of diametrically opposed relatively shallow recesses in the inner surface thereof extending radially from said bore, a spreader disposed within any two diametrically opposed recesses and extending between said legs for normally maintaining said legs apart, and a compression spring in said housing active on said spreader for maintaining it in position.

6. A temporary rivet including a substantially cup-shaped housing having a bore through the bottom thereof, a clamping pin slidably mounted in said housing having legs slidable through said bore, the bottom of said housing having a plurality of diametrically opposed relatively shallow recesses in the inner surface thereof extending radially from said bore, a spreader disposed within any two diametrically opposed recesses and having a portion depending between said legs for normally maintaining said legs apart, and a compression spring in said housing active on said spreader for maintaining it in position.

7. A temporary rivet including a substantially cup shaped housing having a bore through the bottom thereof, a clamping pin slidably mounted in said housing having legs slidable through said bore, the bottom of said housing having a plurality of diametrical recesses in its inner surface, a T-shaped spreader having a crossarm adapted to engage in any one of said recesses, said spreader extending between said legs, and a compression spring in said housing active upon said crossarm for holding it against movement out of the selected recess.

JOHN DE MOOY.